W. H. CLARK.
SPRING SPOKE.
APPLICATION FILED JULY 18, 1912.
1,052,570.
Patented Feb. 11, 1913.
2 SHEETS—SHEET 1.
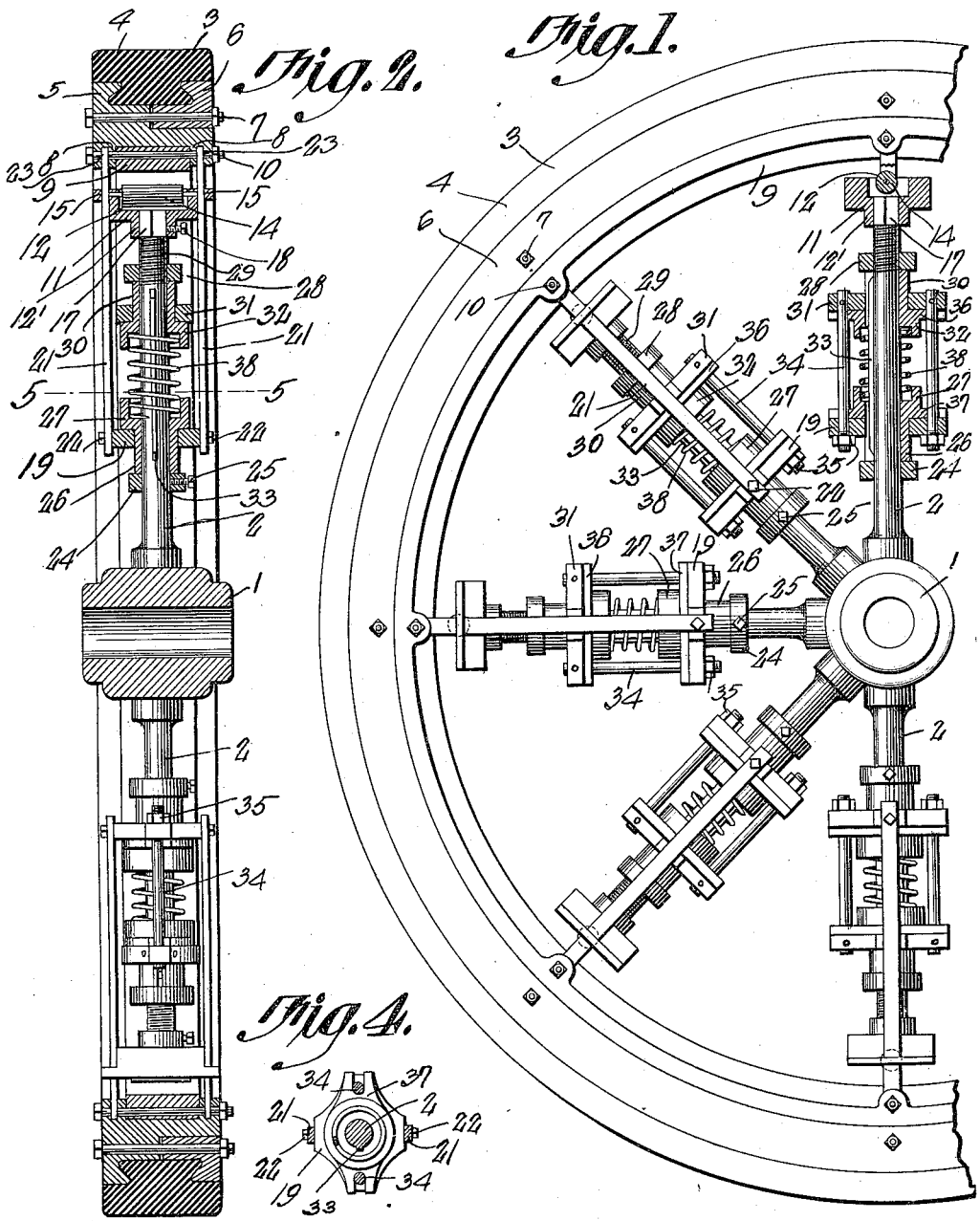
W. H. Clark, Inventor
by C. A. Snow & Co., Attorneys
Witnesses

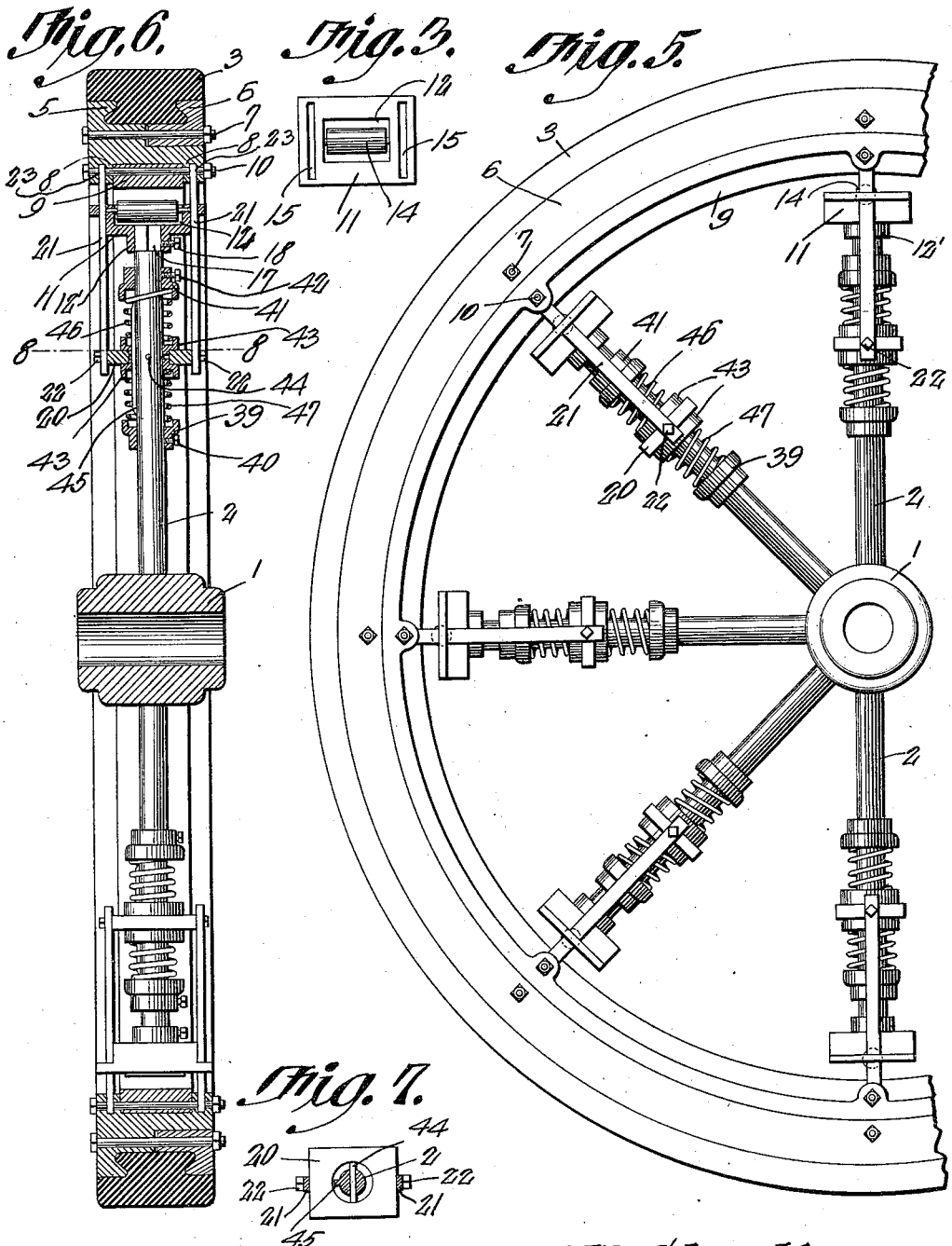

UNITED STATES PATENT OFFICE.

WARREN H. CLARK, OF WEST BURLINGTON, NEW YORK.

SPRING-SPOKE.

1,052,570.  Specification of Letters Patent.  Patented Feb. 11, 1913.

Application filed July 18, 1912. Serial No. 710,302.

*To all whom it may concern:*

Be it known that I, WARREN H. CLARK, a citizen of the United States, residing at West Burlington, in the county of Otsego and State of New York, have invented a new and useful Spring-Spoke, of which the following is a specification.

One object of the present invention is to provide novel means for yieldingly connecting the rim of a wheel with the spokes thereof.

A further object of the invention is to provide novel spring mechanism for supporting the rim.

The invention aims, further, to provide novel means whereby the rim is connected with the spokes for movement radially of the spokes, and for movement circumferentially of the wheel, to a limited extent.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows one form of the invention in side elevation with portions broken away and shown in section. Fig. 2 is a diametrical section of the structure shown in Fig. 1. Fig. 3 is a plan of one of the roller-supporting heads; Fig 4 is a section on the line 5—5 of Fig. 2; Fig. 5 is a fragmental side elevation showing a modified form of the invention; Fig. 6 is a diametrical section of the structure shown in Fig. 6; and Fig. 7 is a transverse section on the line 8—8 of Fig. 2.

The two forms of invention shown, have many points in common, and the parts which exist in both forms of the invention will first be described; next, the structure peculiar to that form of the invention which appears in Figs. 1 and 2 will be described; and finally the structural peculiarities of that form of the invention which is shown in Figs. 6 and 7 will be set forth.

In the drawings, the numeral 1 indicates the hub, the numeral 2 indicates the spokes, and the numeral 3 indicates the rim. The rim 3 is a composite structure and comprises a tire 4, having clencher beads engaged by the clencher flanges of the felly sections 5 and 6 which are overlapped upon each other transversely of the wheel. Bolts 7 or like securing elements are employed for holding the felly sections 5 and 6, the bolts 10 having other functions which will be set forth hereinafter. At their edges, the felly sections 5 and 6 are equipped with flanges 8 between which is held an annular track denoted by the numeral 9. Bolts 10 pass through the flanges 8 and through the track 9, to hold the track 9 in place.

The invention further includes a head, denoted by the numeral 11, and provided with a recess 12 in which a roller 14 is journaled for rotation, the roller 14, under certain circumstances, being adapted to engage the track 9. The head 11 is provided, upon both sides of the recess 12, with slots 15 which extend circumferentially of the wheel. Each head 11 includes a neck 12' in which is received, against rotation, the squared outer end 17 of the adjacent spoke 2, the head 11 being held in place upon the spoke by means of a set screw 18.

Mounted to reciprocate longitudinally of each spoke 2 is a slidable member, denoted by the numeral 19 in that form of the invention which appears in Fig. 2, the slidable member being denoted by the numeral 20 in that form of the invention which appears in Fig. 6. Links 21 are pivotally connected as indicated at 22, at their inner ends, with the slidable members 19 and 20, the links extending through the slots of the head 11. The outer ends of the links 21 enter recesses in the flanges 8, and are supported pivotally, as indicated at 23, upon the bolts 10.

The foregoing features are common to both forms of the invention. The distinctive features of the device shown in Figs. 1 and 2 will now be considered.

Referring to Figs. 1 and 2, it will be seen that to each spoke 2, an inner abutment 24 is secured, by means such as a set screw 25. A thimble 26 rests against the abutment 24, the thimble being mounted to slide in the member 19, the thimble having at its outer end, a laterally projecting head 27 which engages the outer face of the member 19. An outer abutment 28 is mounted upon the spoke 2, the part 28, if desired, being threaded upon the spoke 2, as shown at 29. A thimble 30 is slidably mounted upon the spoke 2, the thimble 30 abutting at one end against the member 28. The thimble 30 is mounted to reciprocate in a slidable member 31, the thimble being provided with a head 32 which engages the inner face of the member 31. The thimbles 30 and 26 are prevented from rotating upon the spoke 2 by means of a spline 33 which is carried by the spoke, the thimbles being slotted longitudinally to receive the spline. The outer ends of guide rods 34 are secured against longitudinal movement, in the member 31, the guide rods 34 being mounted to slide in the member 19. Nuts 35 are applied to the ends of the guide rods 34, the nuts engaging the inner face of the member 19. A guide plate 36 is secured to the inner face of the slidable member 31, and a guide plate 37 is secured to the outer face of the slidable member 19, the guide plates 36 and 37 being mounted to reciprocate upon the guide rods 34. Surrounding the spoke 1 and abutting terminally against the head 32 and against the head 27 is a compression spring 38.

The operation of the device hereinbefore described is as follows: When a weight is imposed upon the hub 1, referring particularly to a spoke which is adjacent the top of the wheel, a pull will be exerted upon the said spoke 2, the guide plate 37 bearing against the head 27, the head 27 bearing against the spring 38, the spring 38 bearing against the head 32, the head 32 engaging the guide plate 36, the guide plate 36 engaging the slidable member 31, and the outer end of the thimble 30 engaging the outer abutment 28. The slidable member 19 is connected by means of the links 21 with the rim 3, and consequently the spring 38 will be put under compression, the member 19, the guide plate 37 and the head 27 moving away from the inner abutment 24, the guide plate 37 sliding toward the periphery of the wheel, upon the guide rods 34. Thus, the hub 1 will be yieldably supported from the upper portion of the rim 3.

Passing now to a description of the operation, considering the spoke which is adjacent the bottom of the wheel, it will be understood that when the hub 1 moves downwardly, the spoke 2 will carry with it the inner abutment 24, the abutment 24 carrying downwardly the member 19, the guide plate 37 and the head 27, the spring 38 being put under compression, the lower end of the spring 38 abutting against the head 32, the head 32 abutting against the guide plate 26, and the guide plate 26 abutting against the slidable member 31, the latter being connected, by the guide rods 34 and the nuts 35 with the member 19 which, in its turn, is supported by the links 21 which extend downwardly into engagement with the rim 3. During the operation last above described, the guide rods 34 do not slide in the head 19, but the thimble 26 does slide in the member 19, to compress the spring 38.

It is to be observed that the links 21 permit the rim 3 to have a limited movement circumferentially of the wheel, and thus, the resiliency of the structure is enhanced, it being noted that a creeping of the rim 3 will be prevented, by reason of the fact that the slots 15 in the head 11 limit the swinging movement of the links 21.

Passing now to a description of those structural features which are peculiar to that form of the invention which appears in Figs. 6 and 7, it will be observed that the spoke 2 is provided with an inner abutment 39 which may be held in place by a set screw 40. An outer abutment 41 is shown, the same being held in place by a set screw 42. A thimble 43 is slidably mounted upon the spoke 2 and is slidable within the member 20. Another thimble, denoted by like numeral, is mounted to slide upon the spoke 2 within the member 20, the adjacent ends of the thimbles 43 abutting against projections 44 which outstand from the spoke 2, within the contour of the member 20, when there is no weight upon the wheel. The thimbles 43 are prevented from rotating upon the spoke 2, by means of a spline 45 which is carried by the spoke, the spline engaging in slots in the thimbles. A compression spring 46 is interposed between one thimble 43 and the outer abutment 41, another compression spring 47 being interposed between the other thimble 43 and the inner abutment 39.

Considering a spoke which is adjacent the top of the wheel, the operation is as follows:—When a weight is imposed upon the hub 1, a pull will be imparted to the spoke 2, the spoke 2 drawing the outer abutment 41 toward the center of the wheel and putting the spring 46 under tension, the spring 46 abutting against the upper thimble 43 which, in its turn, is supported by the member 20, the latter being connected by means of the links 21 with the rim 3 of the wheel. The member 20 will move away from the lower thimble 43, the latter being held in place by the projections 44.

Considering a spoke which is adjacent the bottom of the wheel, the operation is as follows:—

When a downward thrust is imparted to the spoke 2 from the hub 1, the inner abutment 39 will put the spring 47 under compression, the latter abutting against one thimble 43, the same being upheld by the member 20 which, in its turn, is upheld by the links 21 which extend to the rim 3. The other thimble and the spring 46 will be retained in place by the projections 44.

Referring to that form of the invention which appears in Fig. 1, it will be obvious that the abutments 24 and 28 may be moved along the spoke 2 to adjust the compressive effect of the spring 38. Similarly, referring to Fig. 7, the abutments 41 and 39 may be moved toward and away from each other, along the spoke 2, to adjust the tension of the springs 46 and 47.

In practical operation, the roller 14 does not come into contact with the track 9, under ordinary working conditions. However, when an excessive weight is imposed upon the wheel, the roller 14 will engage the track 9 and prevent the springs from becoming broken or "killed."

Having thus described the invention, what is claimed is:—

1. In a wheel, a spoke; a thimble mounted to slide on the spoke; a member mounted to slide on the thimble; a rim; links pivotally connecting the member with the rim; a head carried by the spoke and engaging the links to limit the pivotal movement thereof; anti-friction means upon the head and adapted to engage the rim; and resilient means for supporting the thimble.

2. In a wheel, a spoke; a member mounted to slide upon the spoke; a rim; links connecting the member with the rim; a head carried by the spoke and engaging the links to limit the pivotal movement thereof; anti-friction means upon the head adapted to engage the rim; and resilient means for supporting the said member.

3. In a wheel, a spoke; a thimble mounted to slide on the spoke; a member mounted to slide on the thimble; a rim; means for connecting the member pivotally with the rim; a head carried by the spoke and engaging said means to limit the pivotal movement thereof; anti-friction means upon the head and adapted to engage the rim; and resilient means for supporting the thimble.

4. In a wheel, a spoke; fixed abutments thereon; thimbles adapted to engage the abutments; a compression spring interposed between the thimbles; members slidable upon the thimbles and adapted to engage the thimbles to actuate the same alternately and to put the spring under compression; means for connecting the said members for limited sliding movement; a rim; and means for connecting one of the said members with the rim.

5. In a wheel; a spoke; fixed abutments thereon; thimbles slidable upon the spoke and adapted to engage the abutments; a spring interposed between the thimbles; members slidable upon the thimbles and adapted to slide the thimbles alternately upon the spokes and to put the spring under compression; means for connecting the said members for limited sliding movement; a rim; and links pivotally connecting one of the said members with the rim.

In testimony that I claim the foregoing as my own, I have hereto affixed my signature in the presence of two witnesses.

WARREN H. CLARK.

Witnesses:
KATHERINE F. PEACOCK,
MASON B. LAWTON.

Copies of this patent may be obtained for five cents each, by addressing the "Commissioner of Patents, Washington, D. C."